(12) United States Patent
Noda

(10) Patent No.: US 12,533,922 B2
(45) Date of Patent: Jan. 27, 2026

(54) VEHICLE CONTROL DEVICE

(71) Applicant: TOYOTA JIDOSHA KABUSHIKI KAISHA, Toyota (JP)

(72) Inventor: Shuhei Noda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 18/603,439

(22) Filed: Mar. 13, 2024

(65) Prior Publication Data

US 2025/0042213 A1 Feb. 6, 2025

(30) Foreign Application Priority Data

Aug. 3, 2023 (JP) .................................. 2023-127357

(51) Int. Cl.
 B60G 17/0165 (2006.01)

(52) U.S. Cl.
 CPC .. B60G 17/0165 (2013.01); *B60G 2400/0512* (2013.01); *B60G 2400/252* (2013.01); *B60G 2400/823* (2013.01); *B60G 2500/30* (2013.01)

(58) Field of Classification Search
 CPC .............. B60G 17/0165; B60G 17/017; B60G 2400/823; B60G 2400/0512; B60G 2400/252; B60G 2500/30; B60W 30/095; B60W 30/0956; B60W 30/18163; B60W 30/09; B60W 2554/801; B60Q 1/346; B60Q 1/488
 USPC .............................................. 701/37–40, 28
 See application file for complete search history.

(56) References Cited

U.S. PATENT DOCUMENTS

| 10,759,444 B2* | 9/2020 | Michalakis | B60W 50/06 |
| 10,780,785 B2* | 9/2020 | Kim | B60G 17/0164 |
| 2007/0168128 A1* | 7/2007 | Tokoro | G01S 13/867 |
| | | | 701/301 |
| 2016/0082935 A1* | 3/2016 | Kim | B60T 8/17558 |
| | | | 701/70 |
| 2018/0322413 A1* | 11/2018 | Yocam | G06N 20/00 |
| 2019/0092333 A1* | 3/2019 | Ishioka | B60W 30/095 |
| 2020/0376927 A1* | 12/2020 | Rajaie | B60H 1/00764 |
| 2021/0348630 A1* | 11/2021 | Bachu | F16B 2/22 |
| 2021/0390307 A1* | 12/2021 | Rogness | G06T 19/006 |
| 2023/0115708 A1* | 4/2023 | Xiang | B60W 60/0053 |
| | | | 701/23 |
| 2023/0366984 A1* | 11/2023 | Wang | G01S 7/4815 |
| 2023/0373287 A1* | 11/2023 | Kumagai | B60L 50/64 |
| 2023/0373484 A1* | 11/2023 | Brooks | B60W 30/16 |

(Continued)

FOREIGN PATENT DOCUMENTS

JP 2022-158576 A 10/2022

*Primary Examiner* — Hai H Huynh
*Assistant Examiner* — Johnny H Hoang
(74) *Attorney, Agent, or Firm* — SoraIP, Inc.

(57) ABSTRACT

The vehicle control ECU functions as a detection unit and an attitude control unit. The detection unit detects an object such as a falling object present in front of a vehicle in which an in-vehicle battery as a particular component is provided at a bottom portion of the vehicle body. The attitude control unit controls the air suspension device capable of adjusting the vehicle height so that the vehicle body is in a forward tilting attitude when an object is detected by the detection unit. As a result, the object collides with the front suspension member, thereby suppressing damage to the in-vehicle battery.

10 Claims, 5 Drawing Sheets

(56) References Cited

U.S. PATENT DOCUMENTS

2024/0300487 A1* 9/2024 Otis .................. B60W 30/0956
2025/0083752 A1* 3/2025 Fujino ................ B62D 25/2036

* cited by examiner

VEHICLE CONTROL DEVICE

CROSS-REFERENCE TO RELATED APPLICATION

This application claims priority to Japanese Patent Application No. 2023-127357 filed on Aug. 3, 2023, incorporated herein by reference in its entirety.

BACKGROUND

1. Technical Field

The present disclosure relates to a vehicle control device.

2. Description of Related Art

Technology is described in which a vehicle height adjustment device for adjusting a vehicle front portion and/or a vehicle rear portion of a vehicle is provided, and when the vehicle is traveling on a slope (downhill slope) and also a throttle valve opening degree is 0, a control unit inclines the vehicle forward by the vehicle height adjustment device.

SUMMARY

Technology described in Japanese Unexamined Patent Application Publication No. 2022-158576 (JP 2022-158576 A) is limited to when a condition for inclining the vehicle forward is that the vehicle is traveling on a slope (downhill slope) and also that the throttle valve opening degree is 0. Accordingly, in the technology described in JP 2022-158576 A, when an object such as a fallen object is present in a direction of advance of the vehicle in which a particular component such as a battery is provided at a bottom portion of the vehicle body, there is concern that the particular component may be damaged due to this object colliding with the particular component.

The present disclosure has been made in consideration of the above-described situation, and an object thereof is to provide a vehicle control device capable of suppressing damage to a particular component in a vehicle in which the particular component is provided at a bottom portion of a vehicle body.

A vehicle control device according to a first aspect includes a detection unit for detecting an object that is present in a direction of advance of a vehicle in which a particular component is provided to a bottom portion of a vehicle body, and an attitude control unit that, when the object is detected by the detection unit, controls the vehicle body so as to assume an inclined attitude in which a side of the vehicle body in the direction of advance is lower than an opposite side from the direction of advance.

According to the first aspect, in the vehicle in which the particular component is provided at the bottom portion of the vehicle body, when an object that is present in the direction of advance of the vehicle is detected, the vehicle body is controlled to assume the inclined attitude in which the side of the vehicle body in the direction of advance is lower than the opposite side from the direction of advance. Thus, distance between a predetermined member disposed on the bottom portion of the vehicle body on the side of the vehicle body in the direction of advance from the particular component and the road surface is reduced, and accordingly the predetermined member collides with the object that is present in the direction of advance of the vehicle. Accordingly, the particular component can be suppressed from being damaged, by circumventing the particular component from colliding with the object, or by mitigating impact even when the particular component collides with the object.

According to a second aspect, in the first aspect, the particular component is a battery.

According to the second aspect, the battery can be suppressed from being damaged, in the vehicle in which the battery is provided at the bottom portion of the vehicle body.

According to a third aspect, in the first or second aspect, the vehicle is equipped with an active suspension configured to adjust vehicle height, and the attitude control unit controls the vehicle body so as to assume the inclined attitude, by changing the vehicle height of at least one of the side of the vehicle body in the direction of advance and the side opposite to the direction of advance, by the active suspension.

In the third aspect, the vehicle body is controlled to so as to assume the inclined attitude by changing the vehicle height on at least one of the side of the vehicle body in the direction of advance and the side opposite to the direction of advance, by the active suspension that is capable of adjusting the vehicle height. Accordingly, for example, control can be realized such that the vehicle body assumes an inclined attitude while suppressing effects on the traveling of the vehicle, as compared with a form in which the vehicle is decelerated so that the vehicle body is controlled to assume an inclined attitude.

The present disclosure is advantageous in that damage to the particular component, in the vehicle in which the particular component is provided at the bottom portion of the vehicle body, can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
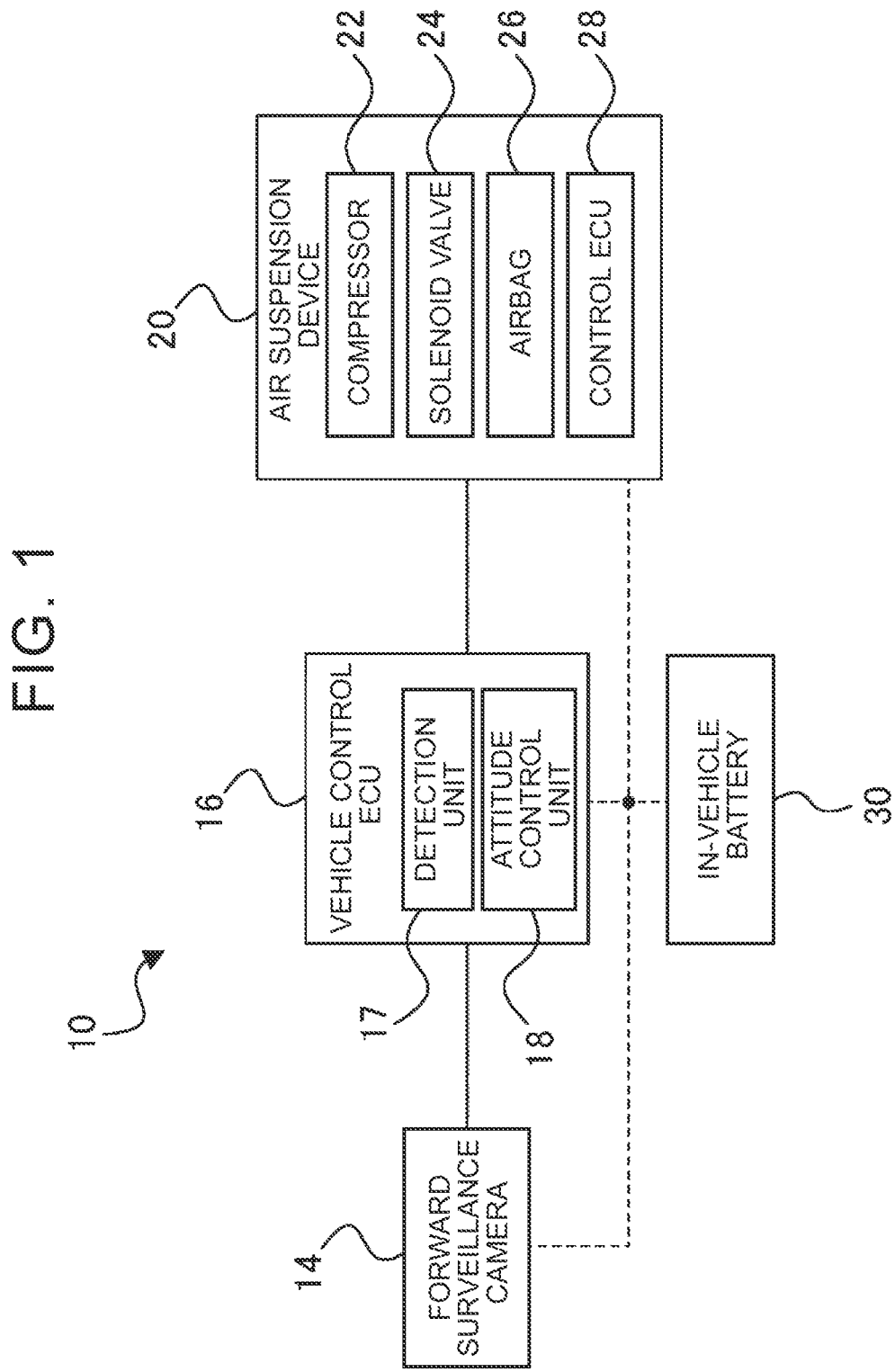
FIG. 1 is a block diagram illustrating a schematic configuration of a vehicle control system according to an embodiment.

Hereinafter, an example of an embodiment of the present disclosure will be described in detail with reference to the drawings. FIG. 1 shows a vehicle control system 10 mounted on a vehicle 12 (see FIG. 2). The vehicle control system 10 includes a front monitoring camera 14, a vehicle control Electronic Control Unit (ECU) 16, an air suspension device 20 capable of independently adjusting the vehicle height of four wheels, and an in-vehicle battery 30. Note that the vehicle control ECU 16 is an exemplary vehicle control device according to the present disclosure.

The front monitoring camera 14 is attached to the ceiling of the vehicle 12 in the vehicle cabin, toward the front of the vehicle 12, continuously captures and records the front of the vehicle 12, and outputs data of the recorded images to the vehicle control ECU 16.

The vehicle control ECU 16 includes memories such as Central Processing Unit (CPU), Read Only Memory (ROM) and Random Access Memory (RAM), non-volatile storage units such as Hard Disk Drive (HDD) and Solid State Drive (SSD), and communication Interface (I/F). The storage unit stores a vehicle control program for causing CPU of the vehicle control ECU 16 to function as the detection unit 17 and the attitude control unit 18.

The detection unit 17 detects an object such as a falling object present in the direction of advance of the vehicle 12 based on the data input from the front monitoring camera 14. The attitude control unit 18 controls the air suspension device 20 so that the vehicle body 12A (see FIG. 2) of the vehicle 12 is in the forward-tilted attitude when an object present in the direction of advance of the vehicle 12 is detected by the detection unit 17.

The air suspension device 20 includes a compressor 22, a solenoid valve 24, an airbag 26, and a control ECU 28. The compressor 22 is connected to a pressure-resistant tank, and the compressed air generated by the compressor 22 is stored in the pressure-resistant tank. In addition, the airbags 26 are provided on four wheels of the vehicle 12 instead of metal springs in a normal suspension (see also FIG. 2). Each airbag 26 is connected to a pressure-resistant tank via an air-supply solenoid valve 24, and is also connected to an exhaust solenoid valve 24.

The control ECU 28 opens the air-supply solenoid valve 24 connected to the airbag 26 when raising the vehicle height of the vehicle body 12A. As a result, the compressed air stored in the pressure-resistant tank flows into the airbag 26, and the entire length of the airbag 26 is extended, thereby increasing the vehicle height on the vehicle body 12A. In addition, the control ECU 28 opens the exhaust solenoid valve 24 connected to the airbag 26 when lowering the vehicle height of the vehicle body 12A. As a result, the air is exhausted from the inside of the airbag 26, and the overall length of the airbag 26 is reduced, thereby lowering the vehicle height on the vehicle body 12A.

Figure 2:
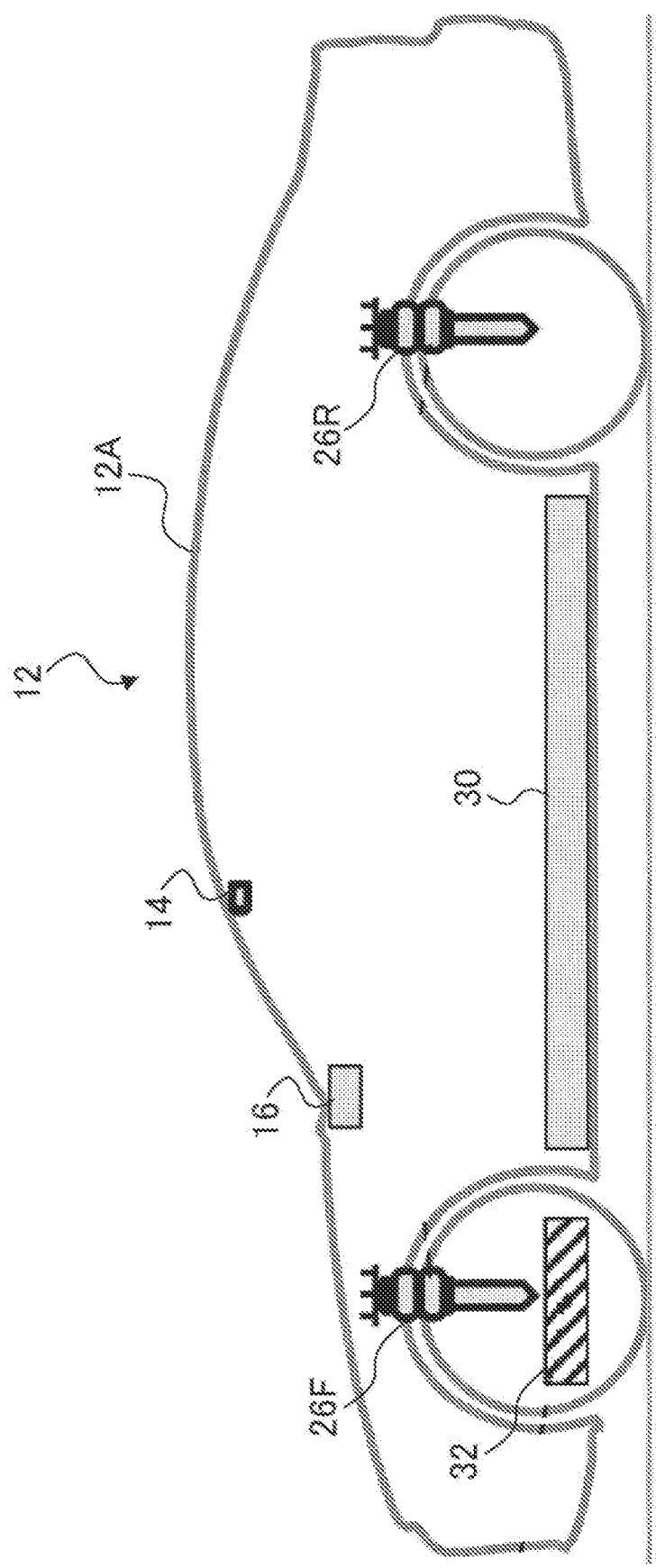
FIG. 2 is a schematic diagram illustrating a state of a vehicle before controlling an attitude.

In the present embodiment, the vehicle 12 is a Battery Electric Vehicle (BEV) that travels with the driving force of the motor by the electric power stored in the in-vehicle battery 30, and the in-vehicle battery 30 is provided below the cabin in the vehicle body 12A as illustrated in FIG. 2. The in-vehicle battery 30 is an example of a particular component in the present disclosure. As illustrated in FIG. 2, a front suspension member 32, which is a metallic structural member, is provided as an exemplary predetermined member at a bottom portion of the vehicle body 12A of the vehicle 12 in front of the in-vehicle battery 30.

Figure 3:
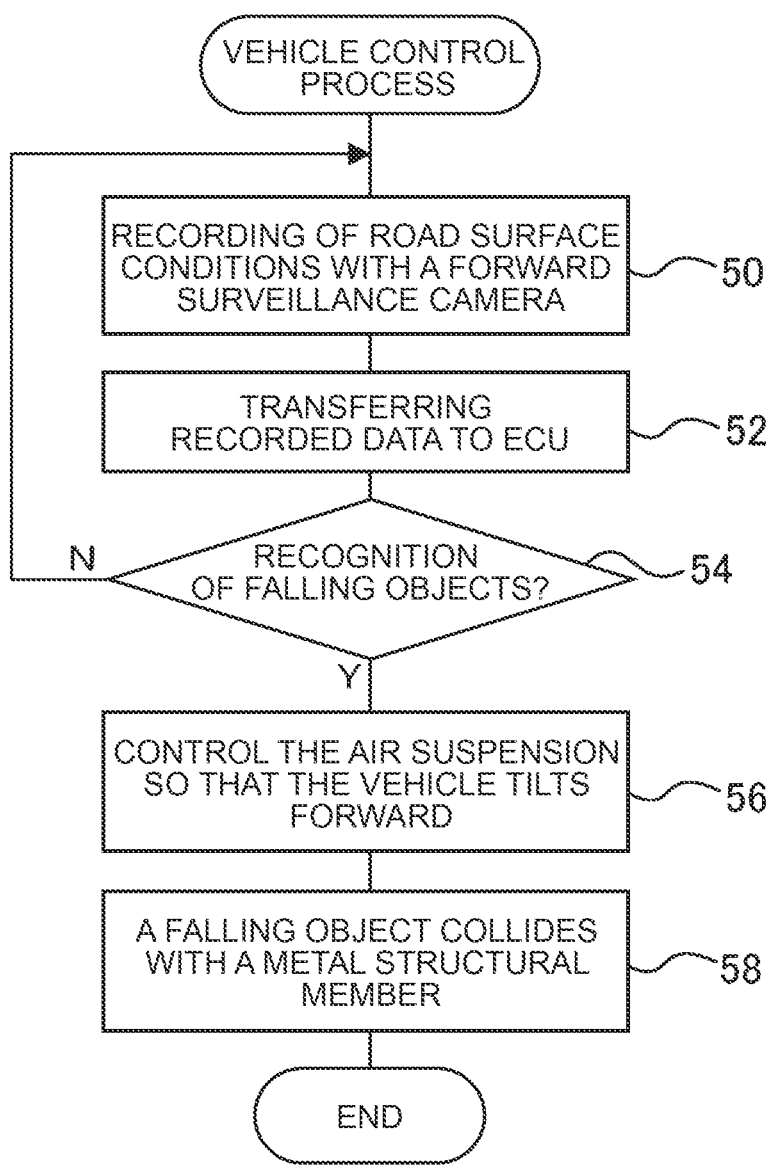
FIG. 3 is a flowchart illustrating a vehicle control process.

Next, as an operation of the present embodiment, a vehicle control process executed while the ignition switch of the vehicle 12 is on and the vehicle is advancing will be described with reference to FIG. 3.

In step 50 of the vehicle control process, the front monitoring camera 14 records (captures) the road surface condition ahead of the vehicle 12, and in subsequent step 52, the front monitoring camera 14 transfers and outputs the recorded data to the vehicle control ECU 16.

In step 54, the detection unit 17 of the vehicle control ECU 16 detects a falling object or the like present in front of the vehicle 12 based on the data inputted from the front monitoring camera 14, and determines whether or not the falling object or the like has been found (recognized). If the determination in step 54 is negative, the process returns to step 50, and steps 50 to 54 are repeated until the determination in step 54 is affirmative.

When a falling object or the like present in front of the vehicle 12 is recognized, the determination in step 54 is affirmative, and the process proceeds to step 56. In step 56, the attitude control unit 18 of the vehicle control ECU 16 controls the air suspension device 20 so that the vehicle 12 is in the forward tilted attitude. This control is performed by outputting, to a control ECU 28 of the air suspension device 20, an instruction for lowering the vehicle height on the front side of the vehicle body 12A (see also arrow A in FIG. 4) and raising the vehicle height on the rear side of the vehicle body 12A (see also arrow B in FIG. 4).

Figure 4:
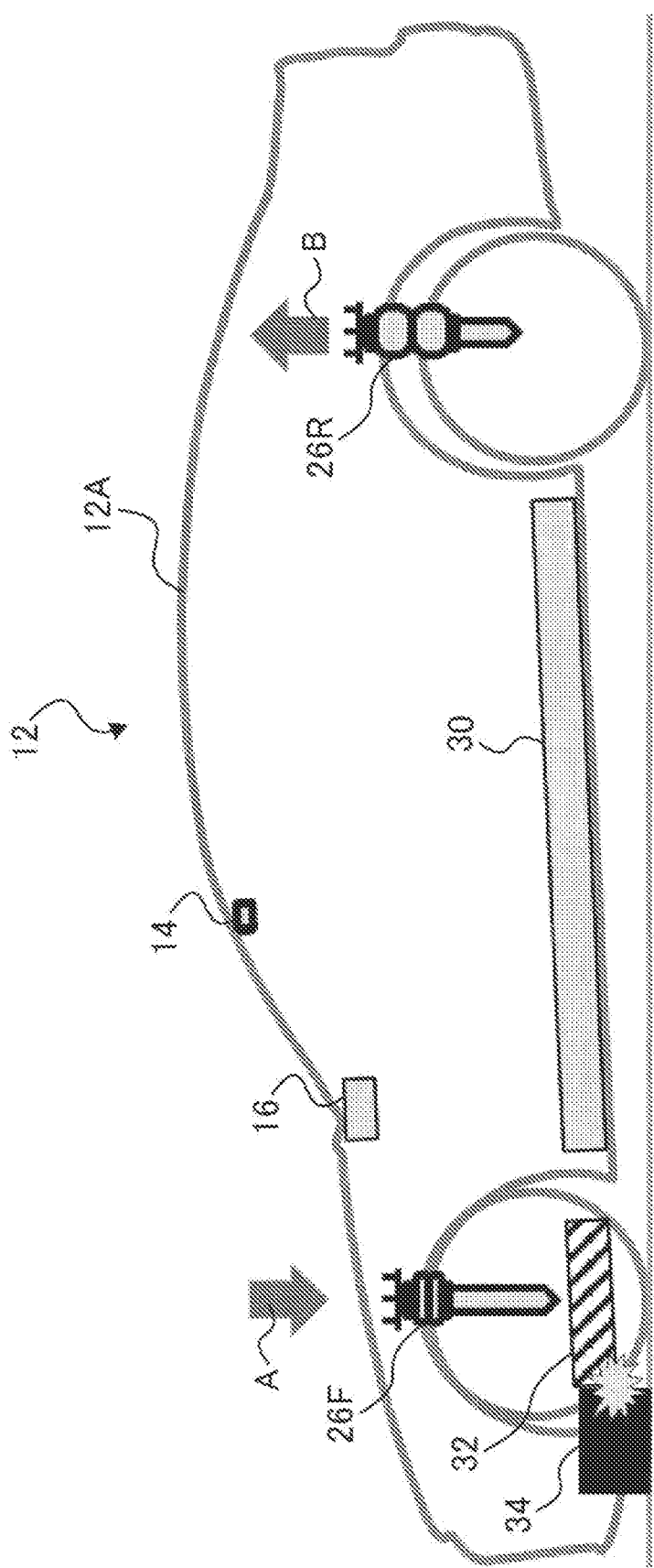
FIG. 4 is a schematic diagram showing the condition of the vehicle after controlling the attitude.

When the above instruction is inputted, the control ECU 28 opens the exhaust solenoid valve 24 for the front-wheel-side airbag 26F (see FIG. 4) of the vehicle 12, and opens the air-supply solenoid valve 24 for the rear-wheel-side airbag 26R (see FIG. 4) of the vehicle 12. As a result, as shown in FIG. 4, the vehicle body 12A is in the forward tilted attitude, and the front suspension member 32 and the road surface become smaller, so that the front suspension member 32 collides with a falling object or the like (step 58). Therefore, it is possible to prevent the in-vehicle battery 30 from colliding with a falling object or the like, or even if the in-vehicle battery 30 collides with a falling object or the like, by reducing the impact, it is possible to suppress the in-vehicle battery 30 from being damaged. Note that an example of the forward tilted attitude is about 0.25° at a pitch angle. Further, in the vehicle control process illustrated in FIG. 3, the vehicle 12 is safely stopped by the occupant of the vehicle 12 who has sensed the abnormality, and thus the execution is ended.

Figure 5:
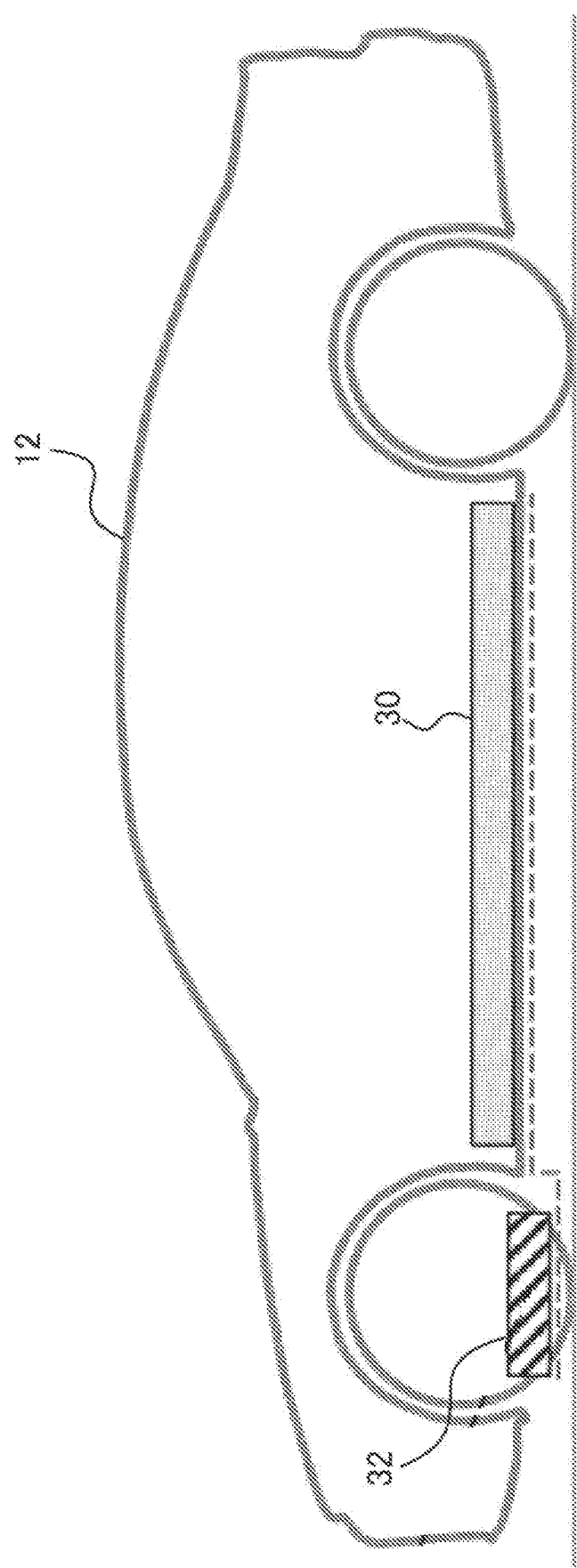
FIG. 5 is an explanatory diagram for explaining a problem in a case where a step is provided between a front suspension member and a battery.

Incidentally, facilitating collision of the front suspension member 32 with a falling object or the like can be realized not only by controlling the vehicle 12 to the forward tilting attitude but also by lowering the mounting position of the front suspension member 32 and reducing the distance from the road surface in advance, as shown in FIG. 5. However, there is a level difference between the front suspension member 32 and the in-vehicle battery 30 on the bottom surface of the vehicle body 12A, which leads to deterioration in aerodynamic performance of the vehicle 12.

On the other hand, in the present embodiment, the front suspension member 32 is easily caused to collide with a falling object or the like by controlling the vehicle 12 to the forward tilting attitude without causing a step between the front suspension member 32 and the in-vehicle battery 30 on the bottom surface of the vehicle body 12A. Accordingly, the aerodynamic performance of the vehicle 12 can be improved as compared with the case where the mounting position of the front suspension member 32 is lowered.

As described above, in the present embodiment, the detection unit 17 detects an object present in the direction of advance of the vehicle 12 in which the particular component (the in-vehicle battery 30) is provided at the bottom of the vehicle body 12A. When an object is detected by the detection unit 17, the attitude control unit 18 controls the vehicle body 12A to have an inclined attitude in which the direction of direction of advance is lower than the direction of direction of advance. Accordingly, in the vehicle 12 in which the particular component (the in-vehicle battery 30) is provided at the bottom of the vehicle body 12A, it is possible to suppress the specific component (the in-vehicle battery 30) from being damaged.

Further, in the present embodiment, the particular component is the in-vehicle battery 30. Accordingly, in the vehicle 12 in which the in-vehicle battery 30 is provided at the bottom of the vehicle body 12A, it is possible to suppress the in-vehicle battery 30 from being damaged.

Further, in the present embodiment, the vehicle 12 is provided with the air suspension device 20 capable of adjusting the vehicle height. Then, the attitude control unit 18 controls the vehicle body 12A to be in the inclined attitude by changing the vehicle height on at least one of the direction of particular component and the direction of advance opposite to the direction of advance by the air suspension device 20. Thus, for example, as compared with a mode in which the vehicle 12 is decelerated and the vehicle body 12A is controlled to be in the inclined attitude, it is possible to realize the control such that the vehicle body 12A is in the inclined attitude while suppressing an effect on the travel of the vehicle 12.

In the above-described embodiment, the case where the direction of advance of the vehicle 12 is the front of the vehicle has been described, but the present disclosure is not limited to this, and the present disclosure is also applicable to the case where the direction of advance of the vehicle 12 is the rear of the vehicle. In this case, the attitude control unit 18 controls the air suspension device 20 such that, when an object present behind the vehicle is detected, the vehicle body 12A is in an inclined attitude (backward inclined attitude) in which the vehicle rear is lower than the vehicle front. As a result, for example, the rear suspension member or the like collides with an object located behind the vehicle as a predetermined member disposed at the bottom portion of the vehicle rear side of the particular component (the in-vehicle battery 30) in the vehicle body 12A by decreasing the distance from the road surface.

Further, in the above-described embodiment, the air suspension device 20 capable of independently adjusting the vehicle height of the four wheels has been described as an example of the active suspension capable of adjusting the vehicle height, but the present disclosure is not limited thereto. The active suspension capable of adjusting the vehicle height may be configured to simultaneously control the front two wheels and the rear two wheels, or may be configured to control only the front two wheels, or may be configured to control only the rear two wheels. For example, in a configuration in which only the front two wheels are controlled, the vehicle body 12A can be set in the forward tilting attitude by lowering the vehicle height on the front side of the vehicle body 12A, and in a configuration in which only the rear two wheels are controlled, the vehicle body 12A can be set in the forward tilting attitude by raising the vehicle height on the rear side of the vehicle body 12A.

Further, in the above-described embodiment, an aspect in which an air suspension is applied as an example of an active suspension capable of adjusting the vehicle height has been described, but the present disclosure is not limited to this. The active suspension capable of adjusting the vehicle height may be, for example, an active suspension configured to operate with hydraulic pressure supplied from a hydraulic pressure source.

Further, in the above-described embodiment, the aspect applied to the vehicle provided with the active suspension capable of adjusting the vehicle height has been described, but the present disclosure is not limited thereto, and the present disclosure is also applicable to the vehicle not provided with the active suspension capable of adjusting the vehicle height. In this case, the control such that the vehicle body 12A is in the inclined attitude can be realized by, for example, decelerating or accelerating the vehicle 12. For example, when the vehicle 12 is decelerated and the vehicle body 12A is tilted forward, the pitch angle of the vehicle 12 of about 0.25° can be obtained with a deceleration acceleration of about 0.15 G.

In the above-described embodiment, the vehicle 12 is a BEV, but the vehicle 12 may be Hybrid Electric Vehicle (HEV), Plug-in Hybrid Electric Vehicle (PHEV), Fuel Cell Electric Vehicle (FCEV), or the like. For example, if the vehicle 12 is a FCEV, the particular component in the present disclosure may be a fuel tank.

Further, when an object present in the direction of advance of the vehicle is detected, in addition to controlling the vehicle body 12A of the vehicle 12 to be in the inclined attitude, for example, the steering of the vehicle 12 may be controlled so that the object collides with the center portion in the vehicle widthwise direction or the like.

What is claimed is:

1. A vehicle control device of a vehicle, comprising an electronic control unit configured to:
   receive information on road surface conditions in a traveling direction of the vehicle from a camera;
   detect whether an object is present in the traveling direction of the vehicle, in which a particular component is provided below a cabin in a vehicle body, based on the information on the road surface conditions received; and
   control the vehicle body of the vehicle such that the vehicle body is inclined that a side of the vehicle body in the traveling direction is lower than an opposite side of the vehicle body from the traveling direction, in response to detecting that the object is present in the traveling direction of the vehicle.

2. The vehicle control device according to claim 1, wherein the particular component is a battery.

3. The vehicle control device according to claim 1, wherein:
   the vehicle is equipped with an active suspension device configured to adjust vehicle height; and
   the vehicle body is controlled by the active suspension device changing the vehicle height of at least one of the side of the vehicle body in the traveling direction or the opposite side of the vehicle body from the traveling direction.

4. The vehicle control device according to claim 1, wherein the side of the vehicle body in the traveling direction is a front side in a front-rear direction of the vehicle, and the opposite side of the vehicle body from the traveling direction is a rear side in the front-rear direction of the vehicle.

5. The vehicle control device according to claim 2, wherein the vehicle has a metal structural member provided at a bottom portion of the vehicle body in front of the battery, and
   the vehicle body is inclined such that the metal structural member collides with the object.

6. The vehicle control device according to claim 5, wherein the metal structural member is a front suspension member.

7. The vehicle control device according to claim 3, wherein the active suspension device includes an air suspension device configured to independently adjust heights of four wheels of the vehicle.

8. The vehicle control device according to claim 7, wherein the air suspension device opens an exhaust solenoid valve for a front-wheel-side airbag of the vehicle, and opens an air-supply solenoid valve for a rear-wheel-side airbag of the vehicle.

9. The vehicle control device according to claim 1, wherein the vehicle body is inclined at a pitch angle of 0.25°.

10. The vehicle control device according to claim 1, wherein the vehicle body is inclined by decelerating or accelerating the vehicle.

\* \* \* \* \*